United States Patent [19]

Burt

[11] Patent Number: 4,625,580
[45] Date of Patent: Dec. 2, 1986

[54] BICYCLE PEDAL MECHANISM

[76] Inventor: Raymond R. Burt, R.R. #4, Orangeville, Ontario, Canada, L9W 2Z1

[21] Appl. No.: 681,278

[22] Filed: Dec. 13, 1984

[51] Int. Cl.[4] .............................................. G05G 1/14
[52] U.S. Cl. .................................. 74/594.4; 74/594.1; 74/594.3
[58] Field of Search .................. 74/594.1, 594.3, 594.4

[56] References Cited

U.S. PATENT DOCUMENTS

| 447,145 | 2/1891 | Cushman | 74/594.3 |
| 571,753 | 11/1896 | Decker | 74/594.3 |

Primary Examiner—Larry I. Schwartz
Attorney, Agent, or Firm—Ridout & Maybee

[57] ABSTRACT

In a bicycle pedal mechanism, the pedal is floatingly mounted on the pedal axle by means incorporating a cam mechanism whereby the pedal is caused to shift longitudinally to and fro in synchronism with the rotation of the crank. In this way the rider's feet are positioned to do useful work for a longer duration of a cycle than would otherwise be the case.

8 Claims, 4 Drawing Figures

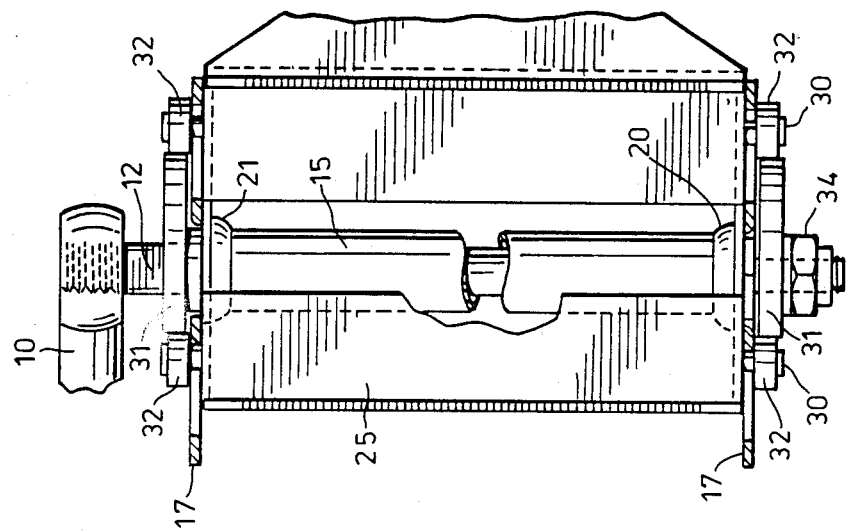
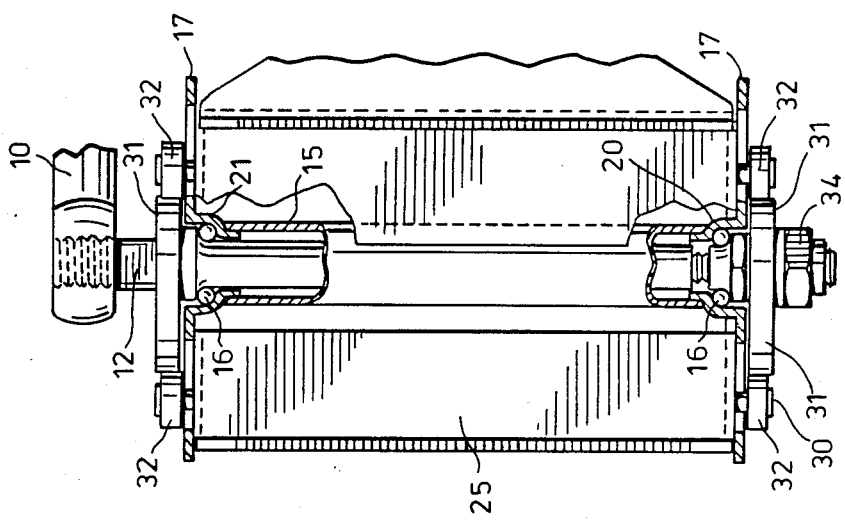

BICYCLE PEDAL MECHANISM

This invention relates to an improved pedal mechanism for bicycles.

In a standard bicycle a crank is used to convert the reciprocatory action of the rider's legs to a rotary movement for driving the rear wheel through a chain and sprocket drive. Most of the useful effort applied by the rider occurs when the rider's feet are moving down and up, respectively, that is to say during the power and return strokes. Little power is transferred in the periods when the pedals are near the uppermost and lowermost positions. Since the pedals move uniformly in a circle, there is an appreciable time during each revolution of the pedals in which effort is wasted.

The present invention provides an improved bicycle pedal mechanism which enables the rider's effort to be applied more efficiently than would be possible with a standard pedal mechanism. The invention takes advantage of the fact that the pedal axle, which is rigidly attached to the end of a crank arm, rotates once for each revolution of the arm; a cam mechanism interconnecting the pedal axle with the pedal effects an oscillatory to and fro movement of the pedal relative to its axle. The pedal therefore follows an oval path so that the time during which it remains in the ineffective upper and lower positions is reduced.

Thus, according to the invention there is provided a bicycle pedal mechanism comprising a pedal axle, means for attaching the pedal axle to one end of a pedal crank arm so as to extend laterally therefrom, a laterally extending axle housing journalled on said axle, the axle projecting from the housing at each end, a pedal frame supported by said axle housing, means constraining the pedal frame to move to and fro transversely with respect to the axle housing, a cam rigidly mounted at each end of the pedal axle, and cam follower means carried by the pedal frame, said cam follower means engaging the cams whereby to effect oscillatory longitudinal movement of the pedal frame in response to rotation of the cams.

In order that the invention may more readily be understood, one bicycle pedal mecahnism will now be described by way of example with reference to the accompanying drawings. In the drawings:

FIG. 3 is a partly sectioned plan view of the mechanism showing the pedal in its retracted position; and FIG. 4 is a partly sectioned plan view showing the pedal in its advanced position.

Figure 1:
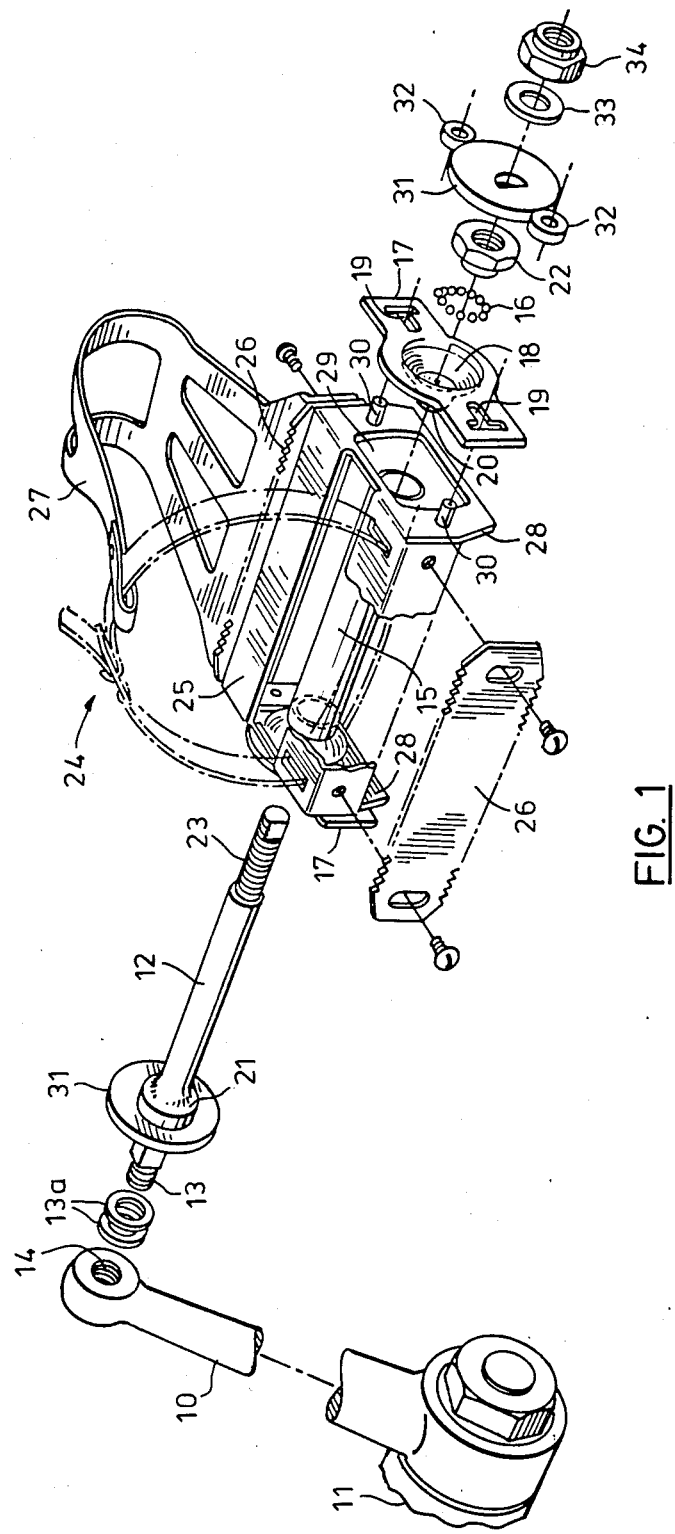
FIG. 1 is an exploded perspective view of the pedal mechanism.

The mechanism described herein and illustrated in the drawings is intended to replace the standard pedal mechanism on a bicycle in which the pedals are rotatably mounted on axles extending laterally from the ends of opposed crank arms. Since the bicycle itself, including the crank and the associated chain and sprocket drive, are well known articles of commerce, the description will be confined to the pedal mechanism as such.

FIG. 1 shows one of the crank arms 10 of a standard crank used on a bicycle. Part of the bicycle frame is shown at 11. A pedal axle 12 is adapted to be rigidly attached to the end of the crank arm 10 so as to extend laterally from it. For this purpose one end of the axle 12 is threaded as shown at 13 so as to engage in a threaded bore or socket 14 at the end of the crank arm.

A tubular housing 15 through which the axle 12 extends is journalled on the axle 12 by bearings 16 at both ends. The housing 15 is shorter than the axle 12 so that the ends of the latter project from it. Fixedly mounted on the opposite ends of the tubular housing 15 are end guide members 17. Each guide member 17 is formed by a longitudinally extending elongated plate having a flanged circular aperture 18, and being formed with a pair of longitudinally aligned guide slots 19 which are diametrically opposed with respect to the aperture 18. The flange of the aperture 18 is generally bell-shaped, and provides a neck portion 20 by which it is fitted to the end of the tubular housing 15, for example by welding, brazing or shrinking. The bell-shaped flange of the aperture 18 provides a bearing housing, serving as the outer race of the respective set of bearings 16. The inner race for the inner set of bearings 16 (not shown in FIG. 1) is defined by a collar portion 21 of the shaft 12. The corresponding inner race for the outer set of bearings 16 is defined by a collar 22 which is threaded onto the threaded outer end 23 of the shaft 12.

The pedal, denoted by the general numeral 24, comprises a pedal frame 25, footgrip members 26 and a conventional strap toe-piece 27. For the most part the pedal is of conventional construction, but instead of being fixedly mounted on the axle housing 15 it is floatingly mounted thereon. For this purpose the pedal frame 25 is formed at its ends with downturned plates 28, each plate 28 having an elongate aperture 29 through which the pedal axle 12 and axle housing 15 extend. Extending laterally from each end plate 28 are a pair of short stub shafts 30, these being longitudinally aligned at opposite ends of the aperture 29. The stub shafts 30 extend through the guide slots 19. The pedal assembly 24 is supported from the axle assembly by the bell shaped end flanges of the axle housing 15, which slidingly engage in the elongate apertures 29. However, by reason of the engagement of the stub shafts 30 in the guide slots 19, the pedal assembly is capable of some movement with respect to the axle assembly, such movement being limited to an oscillatory longitudinal movement.

Rigidly mounted on the axle 12 at its opposite ends are a pair of cams 31. In the present embodiment of the invention these are identical circular cams mounted eccentrically on the axle 12 but in alignment with one another, the eccentricity being the same for each cam. Each cam 31 is associated with a cam follower constituted by a pair of rollers 32 mounted on the respective pair of stub shafts 30. The rollers 32 engage the edge of the cam 31 at diametrically opposite positions. The components are retained on the axle 12 by means of a washer 33 and locknut 34.

As the pedal axle 12 is rigidly mounted on the crank arm 10, it will rotate once about its own axis for each revolution of the crank arm. Accordingly, the cam mechanism formed by the cams 31 and rollers 32 will permit the pedal to oscillate forwards and backwards, completing one cycle of the oscillation for one revolution of the crank arm. The cams are oriented so that the pedal is advanced to the greatest extent during the downstroke and is retracted to the greatest extent during the upstroke. For this purpose, the pedal axle 12 is secured to the pedal crank arm 10 so that the lobes of the cam 31 project in the same radial direction as the crank arm. That is to say, when the pedal is in the uppermost position, the lobes project upwards. To achieve the necessary orientation of the cams when the pedal axle is attached to the crank arm, an appropriate number of packing washers 13a are inserted.

Figure 2:
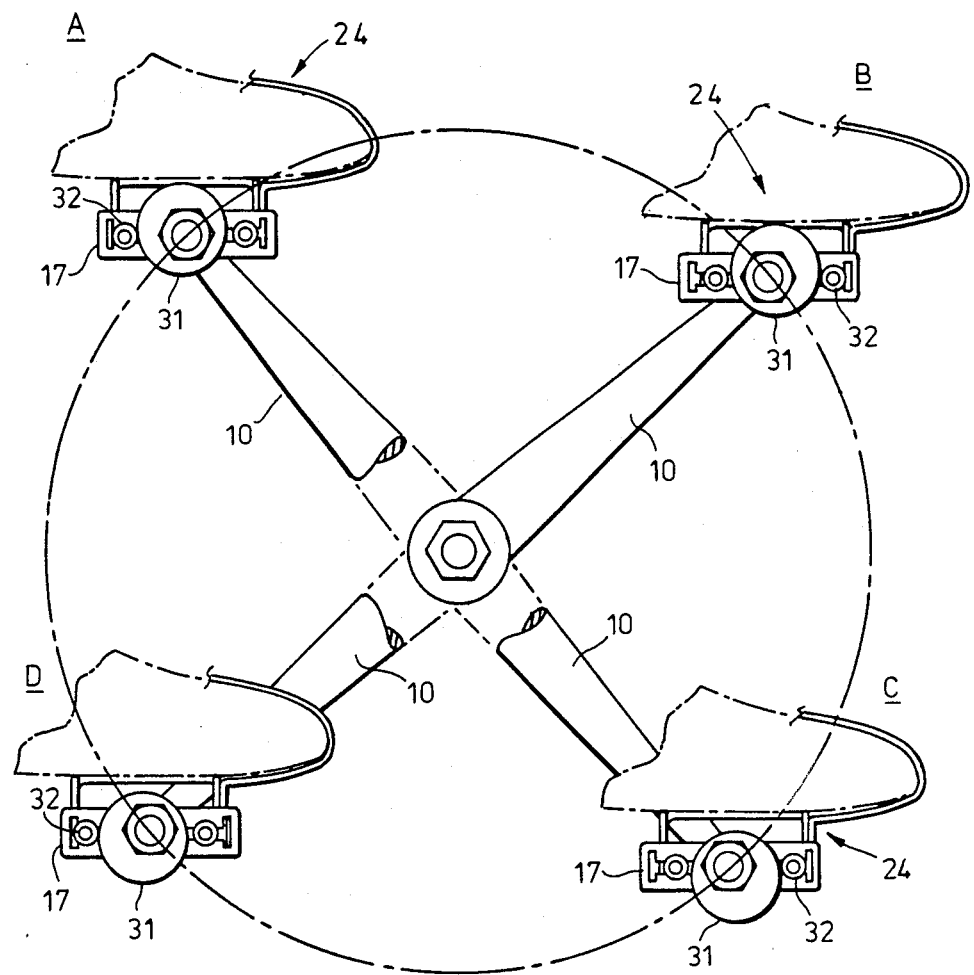
FIG. 2 is a side elevational view showing the pedal in four sequential operative positions.

Thus, referring to FIG. 2, A and B denote positions of the crank arm 10 during which the pedal is being advanced with respect to the pedal axle, and C and D denote positions of the crank arm during which the pedal is being retracted with respect to the pedal axle. The positions of maximum advance and maximum retraction, not shown in FIG. 2, are those in which the crank arm 10 is horizontal. Similarly, when the crank arm 10 is vertical so that the pedal is at its uppermost or lowermost position, the pedal is centred on its axle. FIG. 3 shows the configuration of the pedal in its most retracted position, i.e. when the crank arm is halfway between positions D and A in FIG. 2, and FIG. 4 shows the configuration of the pedal when it is fully advanced, i.e. when the crank arm is half way between positions B and C in FIG. 2.

Although the pedal axle moves uniformly in a circle around the crank axis, as in the case of a standard pedal mechanism, the mechanism of the present invention causes the rider's foot to move in an oval path and to move more rapidly through the top centre and bottom centre positions than would otherwise be the case. Accordingly, for a longer period during each rotation of the crank the rider's feet are positioned to apply effort efficiently.

What I claim is:

1. A bicycle pedal mechanism comprising
   a pedal axle,
   means for attaching the pedal axle to one end of a pedal crank arm so as to extend laterally therefrom,
   a tubular housing journalled on said axle, the axle projecting from the housing at each end,
   a pedal frame,
   support means mounted at the ends of said tubular housing for supporting the pedal frame thereon,
   said support means including means constraining the pedal frame to move to and fro transversely with respect to the support means,
   a cam rigidly mounted at each end of the pedal axle,
   cam follower means carried by the pedal frame at each end thereof,
   said cam follower means engaging the cams whereby to effect oscillatory longitudinal movement of the pedal frame in response to rotation of the cams,
   wherein the support means further comprises a longitudinally extending plate at each end of the tubular housing, each plate having a flanged aperture through which the axle projects, the flange of said aperture being fixedly attached to the respective end of the tubular housing.

2. A bicycle pedal mechanism according to claim 1, wherein said flange defines a bearing housing.

3. A bicycle pedal mechanism according to claim 2, wherein each of said longitudinally extending plates is formed with a pair of diametrically opposed longitudinal slots one on either side of said aperture, and the pedal frame provides a pair of end members having laterally extending guide members engaging in said slots for constraining said movement of the pedal frame.

4. A bicycle pedal mechanism according to claim 3, wherein the cam follower means are constituted by pairs of rollers engaging the cams at opposite edges thereof, the rollers being mounted on stub axles extending laterally from said end members and engaging in said slots to constrain the pedal frame.

5. A bicycle pedal mechanism according to claim 4, wherein each cam is a circular cam mounted eccentrically on the pedal axle.

6. A bicycle pedal mechanism comprising
   a pedal axle,
   means for attaching the pedal axle to one end of a pedal crank arm so as to extend laterally therefrom,
   a pedal frame having end plates at its respective ends, each end plate providing a longitudinally extending elongate aperture,
   a tubular axle housing journalled on said axle, the axle housing having end portions slidingly engaging in said elongate apertures of the pedal frame end plates for supporting the pedal frame,
   the axle housing terminating at each end in a longitudinally extending plate having an aperture through which the axle projects, the plate further providing a pair of longitudinally aligned guide slots on opposite sides of this aperture,
   a pair of stub shafts projecting laterally from each said end plate and engaging in said guide slots for constraining said pedal frame to move to and fro transversely with respect to the pedal axle, and
   cam engaging rollers mounted on said stub shafts operative to effect oscillatory longitudinal movement of the pedal frame in response to rotation of the crank arm.

7. A bicycle pedal mechanism according to claim 6, wherein the apertures of said longitudinally extending plates are defined by bell shaped flanges constituting said end portions of the axle housing.

8. A bicycle pedal mechanism according to claim 7, wherein the axle housing is journalled on the axle by bearings located in bearing housings at opposite ends of the tubular housing defined by the flanges of said aperture.

* * * * *